United States Patent [19]

Storms, Jr. et al.

[11] Patent Number: 4,703,444

[45] Date of Patent: Oct. 27, 1987

[54] SYSTEMS FOR DETERMINING DISTANCES TO AND LOCATIONS OF FEATURES ON A GOLF COURSE

[75] Inventors: Harrison A. Storms, Jr., Rancho Palos Verdes; William C. Cockerell, Jr., Ramona, both of Calif.

[73] Assignee: Spymark, Incorporated, Vista, Calif.

[21] Appl. No.: 847,734

[22] Filed: Apr. 3, 1986

Related U.S. Application Data

[63] Continuation of Ser. No. 519,404, Aug. 1, 1983, abandoned.

[51] Int. Cl.$^4$ .......................... G01C 15/20; G01S 3/02
[52] U.S. Cl. ..................... 364/561; 364/449; 364/460; 342/451; 342/458; 342/463
[58] Field of Search ............... 364/448, 449, 451, 452, 364/460, 561; 342/450, 451, 458, 463

[56] References Cited

U.S. PATENT DOCUMENTS

| | | | |
|---|---|---|---|
| 3,150,372 | 6/1959 | Groth | 364/452 |
| 3,375,520 | 3/1968 | De Groot et al. | 364/452 |
| 4,086,630 | 4/1978 | Speiser et al. | 364/410 |
| 4,480,310 | 10/1984 | Alvarez | 364/460 |

Primary Examiner—Errol A. Krass
Assistant Examiner—Joseph L. Dixon
Attorney, Agent, or Firm—Brown, Martin Haller & Meador

[57] ABSTRACT

A golfer wishing to know the distance to a specified feature on a golf course, operates a portable interrogation unit, to enter a request for the distance to the location of the feature. Transmitters located to define a triangle encompassing a substantial portion of the course transmit ranging signals, which are received by the portable interrogation unit. The portable interrogation unit includes a memory which stores the locations of the transmitters and the locations of predetermined features on the course and a CPU which processes the ranging signals received from the transmitters to determine the location of the portable interrogation unit and further to determine the distance from the portable unit to the specified feature. The portable interrogation unit then displays the determined distance. To survey the locations of the various predetermined features on the course, a portable survey unit is substituted for the portable interrogation unit. Feature identification data is entered and a CPU in the portable survey unit determines the location of the unit by processing the ranging signals and causes such location to be stored in an area of a memory therein that is addressed by the entered feature identification data. The stored feature locations then are transferred to the respective memories of a plurality of portable interrogation units.

8 Claims, 6 Drawing Figures

SYSTEMS FOR DETERMINING DISTANCES TO AND LOCATIONS OF FEATURES ON A GOLF COURSE

This is a continuation of application Ser. No. 519,404 filed Aug. 1, 1983, now abandoned.

BACKGROUND OF THE INVENTION

The present invention generally pertains to electronic communications and is particularly directed to improved systems for determining distances to and locations of predetermined features on a golf course.

Golfers are particularly interested in determining the distance to the pin from their location on the course. In a system described in U.S. Pat. No. 3,868,692 to Woodward et al, separate transmitters are located at each hole on the golf course and transmit RF signals at separate frequencies associated with the respective holes. The golfer carries a portable unit which is tunable to any of the associated frequencies to identify the hole of interest; determines distance to the green based upon the strength of the received signal at the tuned frequency; and displays the determined distance to the golfer.

In another system described in U.S. Pat. No. 4,136,394 to Jones et al, a transponder is mounted at or near the pin on each green on the course and the golfer carries a portable unit which transmits an RF signal to the transponder. The transponder responds to receipt of the RF signal by transmitting an acoustic or sonic signal. The portable unit receives the acoustic or sonic signal; determines distance to the pin based upon the elapsed time between transmission of the RF signal and receipt of the acoustic or sonic signal and displays the determined distance to the golfer.

SUMMARY OF THE INVENTION

The system of the present invention does not require the positioning of a transmitter or a transponder at each pin or at any other feature on the golf course to which the golfer may wish to determine distance, such as a dog leg or a water hazard. Further, the system of the present invention enables ready determination of the distance to any one of various predetermined features on the golf course and also enables a golfer to determine the distance of a drive or fairway shot.

The system of the present invention for determining distances on a golf course includes a portable interrogation unit, which is carried by the golfer and a set of at least three remote station transmitters located at known locations about the golf course to define a triangle encompassing a substantial portion of the golf course.

Each of the transmitters transmits a repetitive ranging signal; and the combined ranging signals from the set of transmitters define repetitive sets of ranging signals.

The portable interrogation unit includes a keyboard for entering a request pertaining to the distance between the location of the portable interrogation unit and a specified location selected from various predetermined locations on the golf course, a receiver for receiving the sets of ranging signals from the remote stations, a processor for processing the received interrogation information signals to determine the distance between the portable interrogation unit and the specified location on the golf course indicated by the entered request, and a display which is responsive to the distance determination for displaying an indication of the requested distance.

In another aspect, the present invention combines the remote stations with a portable survey unit to provide a system for surveying locations of predetermined features on a golf course. The portable survey unit includes a keyboard for entering data identifying a specified predetermined feature selected from various predetermined features on the golf course, such as the pin locations, the tee locations, locations of dog legs, and both the near side and far side of water hazards; a receiver for receiving the sets of ranging signals from the transmitters; a processor for processing the received sets of ranging signals to determine the location on the golf course of the feature indicated by the entered feature identification data; and a memory for storing the golf-course-feature locations determined by the processor in storage areas addressed by the entered feature identification data. The stored golf-course-feature locations are transferred by an interface unit from the memory of the portable survey unit to the memory of the portable interrogation unit, from which they are retrieved for making distance determinations pertaining to such locations.

The survey system of the present invention thereby enables the feature locations stored in the memory of the portable interrogation unit to be readily changed when pin and tee locations are changed on the golf course.

Additional features of the present invention are described in relation to the description of the preferred embodiment.

DESCRIPTION OF THE PREFERRED EMBODIMENTS

Figure 1:
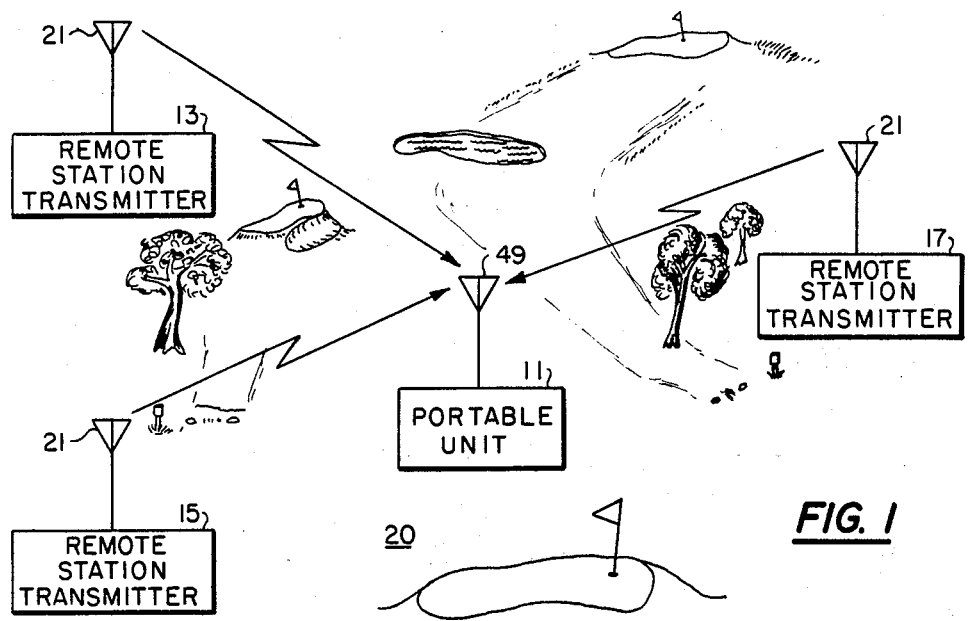
FIG. 1 is a block diagram of the distance determining and location surveying systems of the present invention.

Referring to FIG. 1, a preferred embodiment of the system of the present invention includes a portable unit 11 and three remote station transmitters 13, 15 and 17.

The three remote station transmitters 13, 15, 17 are located at known locations about a golf course 20 to define a triangle encompassing a substantial portion of the golf course 20. The transmitters 13, 15, 17 each transmit repetitive RF ranging signal pulses from an antenna 21. The ranging signal pulses from the respective transmitters 13, 15, 17 are sequentially staggered in a predetermined order to define repetitive sets of sequentially spaced ranging signal pulses. There is a time gap between each set of ranging signal pulses which is substantially greater than the time gap between the successive ranging signal pulses in a set so that the first ranging signal pulse in each set is readily identified.

Figure 2:
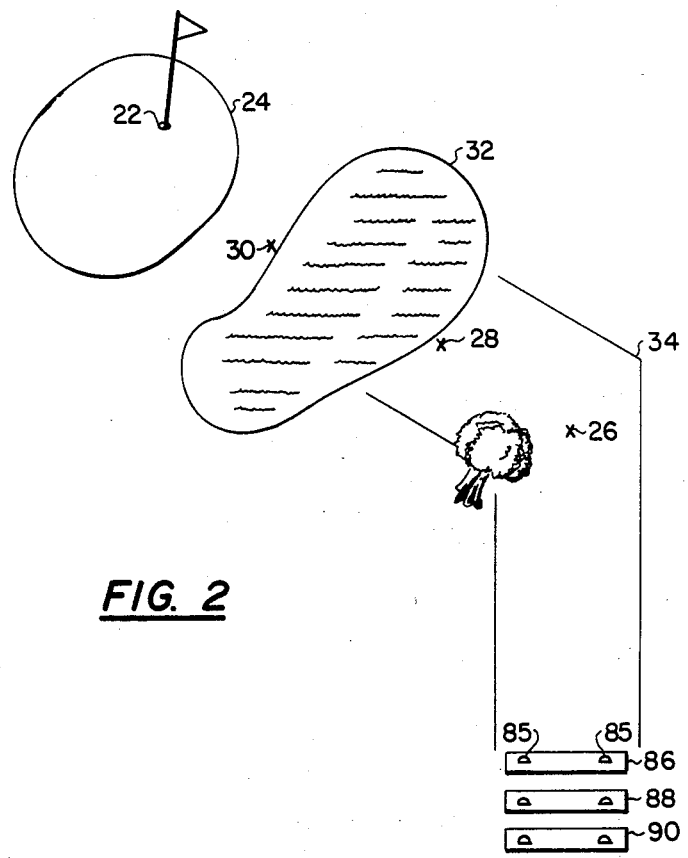
FIG. 2 illustrates the location of various predetermined features on a golf course.

The system for determining distances on the golf course determines the distance between the location of the portable unit 11 and a specified location selected from various predetermined locations on the golf course 20. Referring to FIG. 2, the predetermined locations on the golf course 20 include the locations of various predetermined features on the golf course, such as the location of a pin 22 on a green 24, the location of a dog leg 26, and the locations of both the near side 28 and the far side 30 of a water hazard 32 as one approaches the green 24. The locations chosen to define the dog leg 26 and the near and far sides 28, 30 of the water hazard 32 are along the centerline of the fairway 34.

Figure 3:
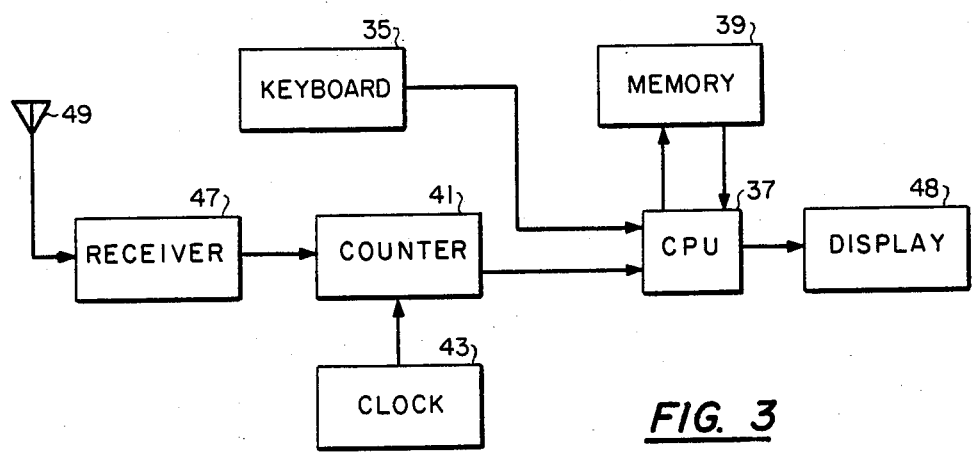
FIG. 3 is a block diagram of a preferred embodiment of a portable unit for use in the system of FIG. 1.

Referring to FIG. 3, the preferred embodiment of the portable unit 11 includes a keyboard 35, a processor including a central processing unit (CPU) 37, a memory 39, a counter 41, a clock 43, a receiver 47, a display 48 and an antenna 49. The preferred embodiment of the keyboard and display of the portable interrogation unit are illustrated in FIG. 4.

The keyboard includes keys and associated indicia indicating golfer number (G1, G2, G3 and G4); the tee that is used by the golfer, i.e. men's (M), ladies (L) or professional (P); the hole number (1, 2, 3, 4, 5, 6, 7, 8, 9 and 0); and various distance requests, i.e. distance to the pin (TO PIN), distance to dog leg (DOG LEG), distance of drive (DRIVE), distance of fairway shot (FWY SHOT), distance to the near side of a water hazard (WATER HAZARD NEAR SIDE) and distance to the far side of the water hazard (WATER HAZARD FAR SIDE). An ON/OFF key also is included. The display of the portable interrogation unit of FIG. 4 includes a first portion 48a for displaying a request for information and a second portion 48b for displaying the response to such request.

The keyboard 35 is operated to enter a request in the CPU 37 pertaining to the distance between the location of the portable interrogation unit 11 and a specified location selected from various predetermined locations on the golf course 20.

Figure 4:
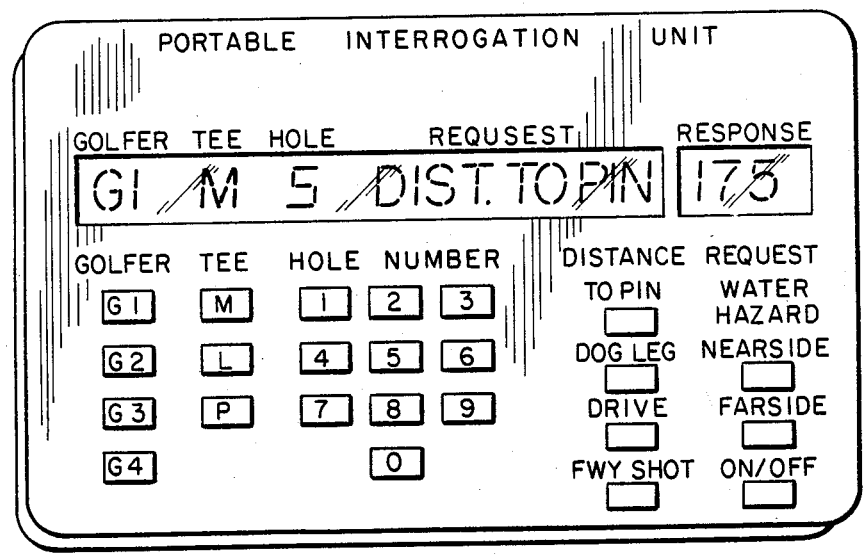
FIG. 4 illustrates a preferred embodiment of a keyboard and display of a portable interrogation unit for use in the system of FIG. 1.

The CPU 37 causes the request to be displayed in the first portion 48a of the display, as illustrated in FIG. 4. In the illustrated example, golfer G1, who is playing from the mens' tees, has requested the distance to the pin on the 5th hole. Data pertaining to the tee from which the golfer is playing is included in the request only when entered by operation of the keyboard 35 and is required when the golfer requests the distance of his drive.

The CPU 37 also stores the specified location identified in the request in the memory 39.

The memory 39 stores data indicating the location of each of the various predetermined locations on the golf course. The stored data indicates the coordinates of the various features on the golf course, such as the locations of the pins, tees, dog legs and water hazards. The storage of the golf-course-feature-location data in the memory 39 is described below with reference to the discussion of the preferred embodiment of the golf course survey system of the present invention.

The memory 39 further stores data indicating the coordinates of the locations of each of the remote station transmitters 13, 15, 17.

The CPU 37 cooperates with the memory 39, the counter 41 and the clock 43 to process the ranging signal pulses to determine the location of the portable unit 11 on the golf course. The transmitted ranging signals from the transmitters 13, 15, 17 are received and provided by the antenna 49 to the receiver 47 and thence to the counter 41.

The counter 41 counts clock pulses provided by the clock 43. The counter begins counting upon receipt of the first ranging signal pulse in each set of three ranging signal pulses received by the receiver 47 and is reset upon receiving the second pulse in the set. Upon resetting, the counter provides a first count signal indicating its accumulated count between the first and second pulses to the CPU 37, and again counts clock pulses from the clock 43. The counter 41 is reset again upon receiving the third pulse of the set of ranging signal pulses and thereupon sends a second count signal indicating the accumulated count between the second and third pulses to the CPU 37.

The CPU 37 processes the first and second count signals from the counter 41 in combination with the remote station transmitter-location data stored in the memory 39 to determine the coordinates of the location of the portable unit 11 on the golf course in accordance with typical prior art range determination processing techniques based upon measuring the relative time of arrival of at least three ranging signals.

Alternatively, the memory 39 contains look-up tables from which the coordinates of different locations on the golf course can be retrieved by the CPU 37 upon the memory 39 being addressed by the source-location information associated with the respective remote station transmitters 13, 15, 17 as provided in the first and second count signals received by the CPU 37 from the counter 41. The degree of resolution of the different locations is dependent upon the amount of memory capacity that is dedicated to the look-up tables.

The CPU 37 accesses the memory 39 in response to the specified location included in the request entered from the keyboard 35 to retrieve an indication of the coordinates of the specified location on the golf course. The CPU 37 then processes the indication of the coordinates of the location of the portable interrogation unit 11 determined by processing the received ranging signals and the indication of the coordinates of the specified location to determine the distance between the portable interrogation unit 11 and the location on the golf course specified in the distance request entered from the keyboard 35.

The CPU 37 causes the determined distance to be displayed on the "response" portion 48b of the display, as illustrated in FIG. 4, where the exemplary distance is shown as 175 yards.

One of the distance requests pertains to the distance of a fairway shot. To determine the distance of a fairway shot when the portable interrogation unit 11 is located at the resultant lay of the ball on the course, the CPU 37 must process the indication of the coordinates of the location of the portable unit 11 in relation to the indication of the coordinates of the location from which the fairway shot was taken. Accordingly, the distance request entered in the portable interrogation unit 11 necessarily includes golfer identification data; and the memory 39 stores an indication of the coordinates of the last previous location from which a request identifying the given golfer was entered in the portable interrogation unit. The last portable-interrogation-unit-location coordinate indication associated with a given golfer is retrieved from the memory 39 by the CPU 37 when the next entered request identifying the given golfer indicates a fairway shot, and thereby indicates the last previous location of the given golfer as the specified location to which the distance from the portable interrogation unit 11 is to be determined.

The preferred embodiment of the system of the present invention for surveying locations of predetermined features on a golf course utilizes many of the components of the distance determination system described above. In the surveying system, a portable survey unit is substituted for the portable interrogation unit.

Referring to FIGS. 1 and 2, a portable survey unit 11 cooperates with the remote station transmitters 13, 15, 17 to survey locations of predetermined features on the golf course 20. The portable survey unit 11 determines the coordinates of the location of a specified predetermined feature selected from various predetermined features on the golf course, such as the locations of the pins 22 on each green 24, the location of each dog leg 26, the locations of both the near side 28 and the far side 30 of a water hazard 32, and the locations of the drive markers 85 on the respective ladies', mens' and professional tees 86, 88 and 90. The locations chosen to define the dog leg 26, the near and far sides 28 and 30 of the water hazards 32, and the drive markers 85 are along the centerline of the fairway 34 (FIG. 2).

Figure 5:
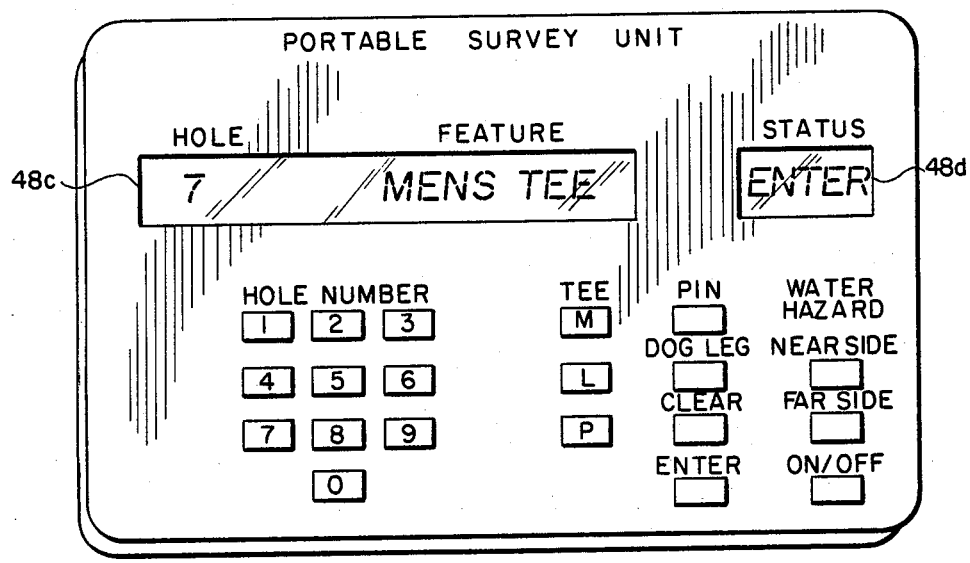
FIG. 5 illustrates a preferred embodiment of a keyboard and display of a portable survey unit for use in the system of FIG. 1.

The preferred embodiment of the keyboard and display of the portable survey unit are illustrated in FIG. 5.

The keyboard includes keys and associated indicia indicating the hole number (1, 2, 3, 4, 5, 6, 7, 8, 9 and 0); tee locations used by men (M), ladies (L) and professionals (P); and various features on the golf course, i.e. pin locations (PI), dog leg location (DOG LEG), and water hazard locations (WATER HAZARD NEAR SIDE) and (WATER HAZARD FAR SIDE). An ON/OFF key and CLEAR and ENTER function keys also are included. The display includes a first portion 48c for displaying an indication of the course feature to be surveyed and a second portion 48d for displaying function status instructions.

FIG. 3 also is applicable to the portable survey unit.

The keyboard 35 is operated to enter data identifying a specified predetermined feature selected from the various predetermined features on the golf course.

The CPU 37 causes the specified feature identified in the entered data to be displayed in the first portion 48c of the display, as illustrated in FIG. 5. In the illustrated example, the specified feature is the mens' tee for the 7th hole. The person surveying the course would stand halfway between the drive markets 85 on the mens' tee 88 of the 7th hole when entering data identifying the specified feature illustrated in this example.

After the keyboard 35 has been operated to provide the specified feature data, as displayed in the feature portion 48c of the display, the person using the portable survey unit then depresses the ENTER key, which causes the CPU to determine the location of the portable survey unit 11.

The memory 39 stores data indicating the coordinates of the location of each of the remote station transmitters 13, 15, 17.

The receiver 47 receives the sets of ranging signal pulses from the remote station transmitters 13, 15, 17. The counter 41 provides first and second count signals in response to the received ranging signals and the CPU 37 processes the first and second count signals in relation to the remote-station-transmitter data stored in the memory 39 to determine the coordinates of the location on the golf course of the feature indicated by the feature identification data entered by the keyboard 35 in the same manner as the first and second count signals are processed to determine the location of the portable interrogation unit on the golf course, as described above.

The golf-course-feature-location coordinates determined by the CPU 37 are stored in the memory 39 in storage areas addressed by the entered feature identification data.

Figure 6:
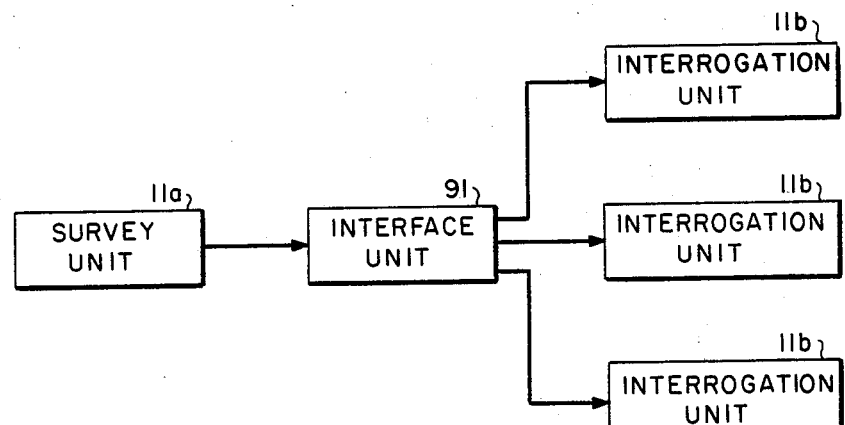
FIG. 6 is a block diagram showing the portable survey unit interfaced with a plurality of portable interrogation units.

Referring to FIG. 6, the golf-course-feature-location coordinates stored in the memory 39 of the portable survey unit 11a subsequently are transferred to the memory 39 of a plurality of portable interrogation units 11b via an interface unit 91 so that distance determinations pertaining to such feature locations .pa can be made in response to requests pertaining thereto entered in the portable interrogation units.

Upon the coordinates of the location of the specified feature being stored in the memory 39 of the portable survey unit, the CPU 37 causes a CLEAR indication to be displayed in the status portion 48d of the portable survey unit display.

The display of the word CLEAR indicates to the operator of the portable survey unit that the location of the specified feature identified in the entered feature-identification data has been stored in the memory 39 of the portable survey unit. The operator then depresses the CLEAR key to clear the feature portion 48c of the display and to enable entry of specified feature identification data from another location on the golf course. Upon the CLEAR key being depressed, the word ENTER appears in the status portion 48d of the display. The operator then can proceed to operate keys to enter the next course feature to be surveyed in the feature portion 48c of the display; and he depresses the ENTER key to determine the location thereof when the portable survey unit is located at the displayed course feature.

In the preferred embodiment, data pertaining to only a selected set of holes is stored in the memory 39 in accordance with the particular holes on the course for which the golfer has paid to play. Also, the CPU 37 prevents data pertaining to a given-numbered hole from being retrieved from the memory 39 once the memory 39 is accessed to retrieve data pertaining to a higher-numbered hole. Retrieval is prevented either by erasing the pertinent data or by denying access thereto.

What is claimed is:

1. A system for determining distances on a golf course, comprising:
a set of at least three remote station transmitters located at known locations about the golf course to define a triangle encompassing substantial portion of the golf course, wherein each of the transmitters transmits a repetitive ranging signal and wherein the combined ranging signals from the set of transmitters define repetitive sets of ranging signals;
a portable interrogation unit, which includes:
means for entering a request pertaining to the distance between the location of the portable interrogation unit and a specified location selected from various predetermined locations on the golf course, said predetermined locations including the locations of various predetermined golf course features;
means for receiving the sets of ranging signals from the transmitters;
interrogation unit processing means for processing the received sets of ranging signals to determine the distance between the portable interrogation unit and said specified location on the golf course indicated by the entered request, said processing means including:
- means for processing the received sets of ranging signals to provide an indication of the location of the portable interrogation unit on the golf course;
- an interrogation unit memory for storing data indicating the location of each of the various predetermined locations on the golf course;
- means for accessing the memory in response to the specified location included in the entered request to retrieve an indication of the specified location on the golf course; and
- means for processing the indication of the location of the portable unit and the indication of the specified location to determine the requested distance; and
- means responsive to said distance determination for displaying an indication of the requested distances; and a portable survey unit for determining the location of specified predetermined features on the golf course, wherein the survey unit includes:
- means for entering data identifying a specified predetermined feature selected from various predetermined features on the golf course;
- means for receiving the sets of ranging signals from the transmitters;
- survey unit processing means for processing the received sets of ranging signals to determine the location on the golf course of the feature indicated by the entered feature identification data; and
- a memory for storing said determined feature location in storage areas addressed by the entered feature identification data.

2. A system according to claim 1, further comprising means for transferring said stored feature position information from the memory of the portable survey unit to the memory of the portable interrogation unit.

3. A system according to claim 1, wherein the predetermined locations include the last previous location from which a request was entered in the portable interrogation unit, and wherein the interrogation unit processing means includes:
- means for storing the last portable interrogation unit location indication in the memory for retrieval when the next entered request indicates said last previous location as the specified location.

4. A system according to claim 1,
wherein the entered request further includes golfer identification data;
wherein the predetermined locations include the last previous location of the given golfer from which a request was entered in the portable interrogation unit; and
wherein the interrogation unit processing means includes:
- means for storing the last portable-interrogation-unit-location indication associated with each golfer in the memory for retrieval when the next entered request identifying the given golfer indicates the said last previous location of the given golfer as the specified location.

5. A system according to claim 1, further comprising a survey unit memory in the portable survey unit for storing the golf-course-feature locations determined by the survey unit processing means in storage areas addressed by the entered feature identification data.

6. A system according to claim 1, wherein the interrogation unit memory stores data pertaining to only a selected set of holes on the golf course.

7. A system according to claim 6, further comprising:
means for preventing retrieval from the interrogation unit memory of data pertaining to a given-numbered hole when the interrogation unit memory is accessed to retrieve data pertaining to a higher-numbered hole.

8. A system according to claim 7, further comprising:
means for preventing retrieval from the interrogation unit memory of data pertaining to a given-numbered hole when the interrogation unit memory is accessed to retrieve data pertaining to a higher-numbered hole.

* * * * *